United States Patent
Oashi

(10) Patent No.: US 11,166,174 B2
(45) Date of Patent: Nov. 2, 2021

(54) MANAGEMENT SERVER, COMMUNICATION SYSTEM, MANAGEMENT SERVER CONTROL METHOD, AND PROGRAM

(71) Applicant: NEC Corporation, Tokyo (JP)

(72) Inventor: Sadahide Oashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 163 days.

(21) Appl. No.: 15/867,979

(22) Filed: Jan. 11, 2018

(65) Prior Publication Data

US 2018/0227776 A1    Aug. 9, 2018

(30) Foreign Application Priority Data

Feb. 9, 2017   (JP) .............................. JP2017-022305

(51) Int. Cl.
```
H04W 24/02      (2009.01)
H04L 29/08      (2006.01)
H04L 12/26      (2006.01)
H04L 12/24      (2006.01)
H04W 4/08       (2009.01)
H04W 4/02       (2018.01)
```

(52) U.S. Cl.
CPC ......... *H04W 24/02* (2013.01); *H04L 41/0893* (2013.01); *H04L 67/1002* (2013.01); *H04L 67/1095* (2013.01); *H04L 67/289* (2013.01); *H04W 4/08* (2013.01); *H04L 43/0852* (2013.01); *H04L 67/18* (2013.01); *H04W 4/02* (2013.01)

(58) Field of Classification Search
USPC ................................................ 709/203, 222
See application file for complete search history.

(56) References Cited

U.S. PATENT DOCUMENTS

| | | | |
|---|---|---|---|
| 7,197,574 B1 | 3/2007 | Ishiyama | |
| 9,787,775 B1 * | 10/2017 | Richardson | ........... H04L 67/141 |
| 10,182,129 B1 * | 1/2019 | Peterson | ................. H04L 67/32 |
| 10,333,789 B1 * | 6/2019 | Dippenaar | ........... H04L 67/025 |
| 2006/0206586 A1 | 9/2006 | Ling et al. | |

(Continued)

FOREIGN PATENT DOCUMENTS

| | | | |
|---|---|---|---|
| JP | 2001-103092 A | 4/2001 | |
| JP | 2002-374290 A | 12/2002 | |

(Continued)

OTHER PUBLICATIONS

Japanese Office Action for JP Application No. 2017-022305 dated Aug. 21, 2018 with English Translation.

(Continued)

*Primary Examiner* — Brian Whipple

(57) ABSTRACT

A management server comprises: a grouping part that performs grouping a plurality of terminals including arbitrary terminals into a same group; a candidate selection part that selects a destination candidate server(s) from among a plurality of predetermined servers; and a connection destination determination part that determines, from among the destination candidate servers, a connection destination server to which the plurality of terminals connect, based on a difference in delays between the plurality of terminals belonging to the same group on a communication to the destination candidate server(s).

9 Claims, 8 Drawing Sheets

(56) References Cited

U.S. PATENT DOCUMENTS

| | | | |
|---|---|---|---|
| 2007/0281724 A1* | 12/2007 | Isobe | H04L 29/06027 |
| | | | 455/518 |
| 2010/0046527 A1* | 2/2010 | Li | H04L 45/56 |
| | | | 370/400 |
| 2010/0057935 A1 | 3/2010 | Kawai et al. | |
| 2012/0239739 A1* | 9/2012 | Manglik | G06F 9/5077 |
| | | | 709/203 |
| 2014/0019970 A1 | 1/2014 | Okamoto | |
| 2016/0142256 A1* | 5/2016 | Yang | H04L 41/0823 |
| | | | 709/223 |

FOREIGN PATENT DOCUMENTS

| | | |
|---|---|---|
| JP | 2003-167810 A | 6/2003 |
| JP | 2006-332825 A | 12/2006 |
| JP | 2008-533847 A | 8/2008 |
| JP | 2011-146788 A | 7/2011 |
| JP | 2016-208443 A | 12/2016 |
| WO | 2012/132808 A1 | 10/2012 |

OTHER PUBLICATIONS

Japanese Office Action for JP Application No. 2017-022305 dated Mar. 12, 2019 with English Translation.

Higashi et al., "Server Selection for Performance Equalization in Distributed Systems", IEICE Technical Report, pp. 65-70, vol. 109, No. 273, cited in JPOA.

Japanese Office Action for JP Application No. 2017-022305 dated Feb. 6, 2018 with English Translation.

\* cited by examiner

FIG. 6

| GROUP ID | MANAGEMENT SERVER | 1st RANKED CANDIDATE SERVER | | | 2nd RANKED CANDIDATE SERVER | | |
|---|---|---|---|---|---|---|---|
| | CRITERION TERMINAL ID | SERVER ID | CRITERION TERMINAL ID | COMMUNI-CATION DELAY DIFFERENCE | SERVER ID | CRITERION TERMINAL ID | COMMUNICATION DELAY DIFFERENCE |
| 0001 | TERMINAL 4(d) | SERVER 1(c) | TERMINAL 4(a) | 20ms | SERVER 1(a) | TERMINAL 4(d) | 50ms |
| 50 | 51 | 52 | 53 | 54 | 55 | 56 | 57 |

MANAGEMENT SERVER, COMMUNICATION SYSTEM, MANAGEMENT SERVER CONTROL METHOD, AND PROGRAM

REFERENCE TO RELATED APPLICATION

The present invention is based upon and claims the benefit of the priority of Japanese patent application No. 2017-022305, filed on Feb. 9, 2017, the disclosure of which is incorporated herein in its entirety by reference thereto.

TECHNICAL FIELD

The present invention relates to a management server, a communication system, a management server control method, and a program.

BACKGROUND

In recent year, because of IoT (Internet of Things), usages of respective devices are diversified, and a situation where various devices are used on a radio communication system is increasing. Furthermore, when the respective devices perform a processing(s) as the IoT device, a case where a real-time processing(s) is considered to have importance is increasing.

In a radio communication system, it is preferred to be a small delay on a communication between a terminal and a server. However, in the radio communication system, as there is a long physical distance between the terminal and the server, the delay on the communication between the terminal and the server increases. In addition, as an access to a specified server from a terminal(s) is converged, load on the specified server increases.

Therefore, a technique (edge computing) where relatively small-sized servers (edge servers) are located at distributed places, then a terminal connects to a neighbor edge server is used. Connecting from the terminal to the edge server that is located at a distributed place can reduce the delay on the communication between the terminal and the server than connecting from the terminal to a particular server (a data center, etc.) that is located at a faraway place. Furthermore, by allocating the edge servers at the distributed places, the load on the servers decreases.

In Patent Document 1, there is described a technique of determining a priority of a server based on load information of a server in an area and load information of servers in other areas, and determining a server to which the terminal connects.

In Patent Document 2, there is described a technique of selecting a virtual machine activation server to be connected according to location coordinate information of a thin client terminal.

In Patent Document 3, there is described a technique of determining a data center providing services for a client according to a processing delay, at the client, for receiving a response from the data center.

[Patent Document 1] JP Patent Kokai Publication No. 2002-374290A
[Patent Document 2] International Publication No. WO2012/132808
[Patent Document 3] JP Patent Kokai Publication No. 2006-332825A

SUMMARY

The disclosure of the above Patent Documents is incorporated herein by reference thereto. The following analysis has been given by the present invention.

As described above, in a radio communication system, connecting from the terminal to a neighbor server (in the following, it is just referred to as a server) can reduce a delay on a communication between the terminal and the server.

However, for instance, there is a case where it is necessary for an online game, etc. to perform grouping a plurality of terminals including arbitrary terminals into one group, and to connect to a server from the terminals belonging to the same group. In that case, according to locations of the terminals, there will be differences in delays between the terminals belonging to the same group on a communication with the server.

For instance, in a case where a real-time processing(s) is considered to have importance in a communication between the server and terminals, as the differences in the delays between the server and respective terminals belonging to the same group will be greater, less fairness will result between the terminals.

In addition, in a case where the real-time processing(s) is performed, if performing the processing(s) is distributed on a plurality of servers, it becomes necessary to synchronize the processing(s) between the servers. As a result, delays between the servers are generated through synchronizing the processing(s), then, the respective servers cannot efficiently perform the processing(s).

In the techniques described in Patent Documents 1 to 3, respective terminals determine, by using location information of the respective terminals, a server to which the respective servers connect. Accordingly, in a case where it is necessary to perform grouping a plurality of terminals including arbitrary terminals into one group, and to connect to a same server from the plurality of terminals belonging to the same group, in the techniques described in Patent Documents 1 to 3, respective terminals could not fairly connect to the server.

Therefore, it is an object of the present invention to provide a management server, a communication system, a management server control method, and a program that contribute to fairly and efficiently connecting to a same server from a plurality of terminals.

According to a first aspect, there is provided a management server. The management server comprises a grouping part that performs grouping a plurality of terminals including arbitrary terminals into a same group.

Further, the management server comprises a candidate selection part that selects a (one or more) destination candidate server(s) from among a plurality of predetermined servers.

Further, the management server comprises a connection destination determination part that determines, from among the destination candidate servers, a connection destination server to which the plurality of terminals connect, based on a difference in delays between the plurality of terminals belonging to the same group on a communication to the destination candidate server(s).

According to a second aspect, there is provided a communication system. The communication system comprises a management server that connects to a plurality of terminals via a network, and a plurality of predetermined servers located at distributed different places.

The management server comprises a grouping part that performs grouping a plurality of terminals including arbitrary terminals into a same group.

Further, the management server comprises a candidate selection part that selects a (one or more) destination candidate server(s) from among the plurality of predetermined servers.

Further, the management server comprises a connection destination determination part that determines, from among the destination candidate servers, a connection destination server to which the plurality of terminals connect, based on a difference in delays between the plurality of terminals belonging to the same group on a communication to the destination candidate server(s).

According to a third aspect, there is provided a management server control method. The management server control method comprises performing grouping a plurality of terminals including arbitrary terminals into a same group.

Further, the management server control method comprises selecting a (one or more) destination candidate server(s) from among a plurality of predetermined servers.

Further, the management server control method comprises determining, from the destination candidate server(s), a connection destination server to which the plurality of terminals connect, based on a difference in delays between the plurality of terminals belonging to the same group on a communication to the destination candidate server(s).

Note that, the present method is associated with a particular machine, which is a management server that connects to a plurality of terminals via a network.

According to a fourth aspect, there is provided a non-transitory computer readable recording medium storing a program causing a computer that controls a management server to execute.

The program causes the computer to execute the processing of performing grouping a plurality of terminals including arbitrary terminals into a same group.

Further, the program causes the computer to execute the processing of selecting a (one or more) destination candidate server(s) from among a plurality of predetermined servers.

Further, the program causes the computer to execute the processing of determining, from among the destination candidate servers, a connection destination server to which the plurality of terminals connect, based on a difference in delays between the plurality of terminals belonging to the same group on a communication to the destination candidate server(s).

Note that, this program can be stored in a computer-readable storage medium. The storage medium can be a non-transient one such as semiconductor memory, hard disk, magnetic storage medium, and optical storage medium. The present invention can be embodied as a computer program product.

According to each aspect, a management server, a communication system, a management server control method, and a program that contribute to fairly and efficiently connecting to a same server from a plurality of terminals are provided.

BRIEF DESCRIPTION OF THE DRAWINGS

FIG. 6 is an image illustrating an example of a communication delay management table 25.

PREFERRED MODES

Figure 1:
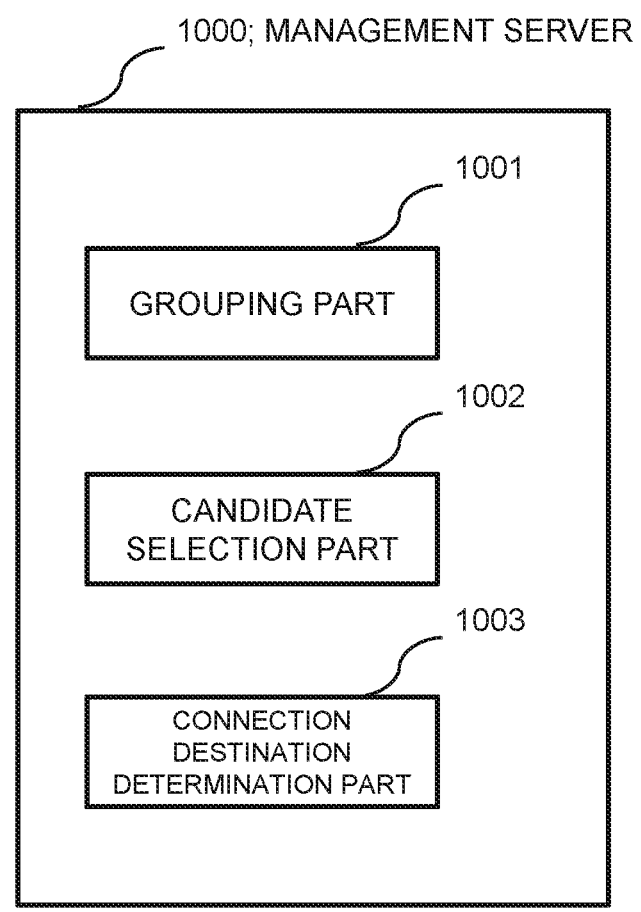
FIG. 1 is a block diagram illustrating an example of a configuration of a management server according to an example embodiment.

First, an outline of an example embodiment of the present invention will be given using FIG. 1. Note that, drawing reference symbols are given to each element for convenience as examples solely for facilitating understanding, and the description of the outline is not intended to suggest any limitation. In addition, connection lines between blocks in respective block diagrams include dual direction and single direction. Further, it is deemed to be disclosed, even when a part (input/output part) or interface be not explicitly mentioned at the connecting end(s) of a connecting line(s) connected to a functional member (part, block, unit or the like). Also, a line(s) is deemed as disclosed, even when such is omitted in the Drawing, which will become evident from the entire disclosure.

As described above, it is desired that a management server that contributes to fairly and efficiently connecting to a same server from a plurality of terminals.

Therefore, as an example, a management server 1000 shown in FIG. 1 is provided. The management server 1000 comprises a grouping part 1001, a candidate selection part 1002, and a connection destination determination part 1003.

The grouping part 1001 performs grouping a plurality of terminals including arbitrary terminals into a same group. Regardless of specifications of respective terminals, processing(s) performed by the respective terminals, and communication performance on the respective terminals, the grouping part 1001 may perform grouping the plurality of terminals including arbitrary terminals into the same group. For instance, the grouping part 1001 may perform randomly grouping the plurality of terminals including arbitrary terminals into the same group.

The candidate selection part 1002 selects a (one or more) destination candidate server(s) from among a plurality of predetermined servers. The destination candidate server(s) is a candidate(s) of a destination server(s) to which the plurality of terminals belonging to the same group connect. In addition, the plurality of predetermined servers that are targets for selection may comprise same functions and same constitutions.

The connection destination determination part 1003 determines, from among the destination candidate servers, a connection destination server to which the plurality of terminals connect, based on a difference in delays between the plurality of terminals belonging to the same group on a communication to the destination candidate server(s) selected by the candidate selection part 1002.

Here, regarding response times between the destination candidate server(s) and the plurality of terminals belonging to the same group, the difference in the delays on the communication to the destination candidate server(s) indicates a difference between response times on a communication between respective terminals. As the difference in the delays between the plurality of terminals belonging to the same group on the communication to the destination candidate server(s) are small, the difference between response times between the plurality of terminals belonging to the same group are small.

For instance, it is assumed that it is aimed to enhance fairness between the plurality of terminals, in a case where the plurality of terminals belonging to the same group connect to a same server. In that case, it is preferred to determine, as the connection destination server, the candidate server(s) where the difference in the delays between the plurality of terminals belonging to the same group are relatively small among a plurality of destination candidate servers.

In addition, for instance, it is assumed that the plurality of terminals respectively connect to a different server. In that case, it is preferred that processing(s) are synchronized between the servers in order to enhance fairness between the plurality of terminals on a real-time processing(s). However, in a case where the servers respectively perform a synchronizing processing(s) with other servers, there is a possibility of generating a delay caused by the synchronization processing(s) between the servers.

On the other hand, the management server 1000 determines the connection destination server so that a plurality of terminals including arbitrary terminals connect to a same server. Accordingly, even if the plurality of terminals connect to a server, and perform a real-time processing(s), the management server 1000 can avoid delays caused by the synchronization processing(s) between servers.

Therefore, the management server 1000 contributes to fairly and efficiently connecting to a same server from a plurality of terminals.

First Example Embodiment

A first example embodiment will be described with reference to the drawings.

Figure 2:
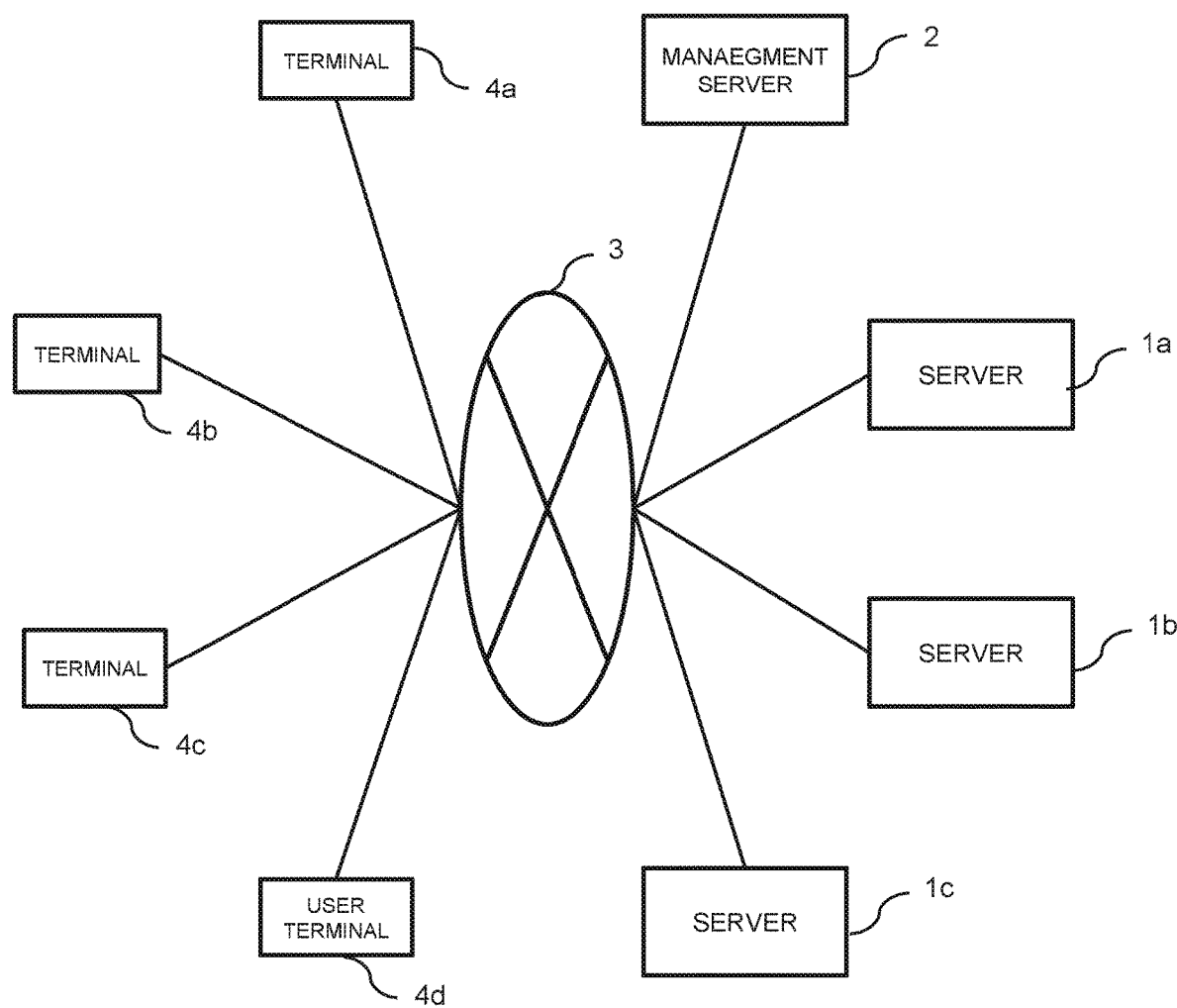
FIG. 2 is a block diagram illustrating an example of a configuration of a communication system.

FIG. 2 is an image illustrating an example of configuration of a communication system accordingly to the present example embodiment. The communication system of the present example embodiment comprises severs (not less than two) (1*a* to 1*c*), a management server 2, and terminals (not less than two) (4*a* to 4*d*). Note that, a configuration of the communication system shown in FIG. 2 is an example, and is not intended to limit the configuration of the communication system of the present example embodiment to the configuration shown in FIG. 2. In addition, in explanations below, in a case where it is not necessary for the servers (1*a* to 1*c*) and the terminals (4*a* to 4*d*) to distinguish each other, they are referred to as servers 1 (or server 1) and terminals 4 (or terminal 4). In addition, though FIG. 2 shows three servers (1*a* to 1*c*) and four terminals (4*a* to 4*d*), this is not intended to limit the number of servers, and the number of terminals to three servers and four terminals. The communication system of the present example embodiment may comprise one, two or not less than four servers 1. Similarly, the communication system of the present example embodiment may comprise one to three or not less than five terminals 4.

The terminals 4, the servers 1 and the management server 2 connect via a network 3.

The terminals 4 are apparatuses (computers) used by a user, and comprise a CPU(s) (Central Processing Unit), a memory(s), and a communication part(s), etc.

The management server 2 is a computer configured to determine a server 1 to which the terminals 4 connect. Generally, the computer includes at least one processor, and at least one memory (or storage device) and input/output interfaces.

The servers 1 are computers located at distributed different places, and comprise a CPU(s), a memory(s), and a communication part(s), etc.

The servers 1 connect to the terminals 4, then, perform a processing(s) of transmitting/receiving data, a processing(s) to the terminals 4, and so on. Here, it is assumed that respective servers 1 of the present example embodiment comprise same function as those on other servers 1. Namely, it is assumed that, by connecting to any one of the servers 1 from the terminal 4, the terminal 4 can perform transmitting/receiving data as similar as that of transmitted and received when the terminal 4 connects to the other servers 1. In addition, it is assumed that, by connecting to any one of the servers 1 from a terminal 4, a server 1 that is a destination of a connection performs a processing(s) on the terminal 4, wherein the processing(s) is similar to that on performed on the other servers 1.

Furthermore, the servers 1 comprise a part (not shown) configured to acquire own location information. Similarly, the terminals 4 comprise a part (not shown) configured to acquire own location information. For instance, the servers 1 and/or the terminals 4 may comprise a GPS (Global Positioning System). In other way, the servers 1 and/or the terminals 4 may connect to an apparatus(es) (not shown) that monitors locations of the servers 1 and/or locations of the terminals 4 via the network 3. Then, the servers 1 and/or the terminals 4 may acquire own location information from the apparatus(es) that monitors the location information.

The terminals 4 transmit to the management server 2 own location information and a request for connecting to the servers 1. Note, it is assumed that the request for the connecting includes information specifying the terminals 4 via the network 3 (information identifying the terminals 4, IP addresses of the terminals 4, and so on). Here, the terminals 4 do not need to specify a server 1 that is a destination of a connection. In a case where the management server 2 received, from the terminals 4, the request for the connecting to a server 1, the management servers 2 determine, from among a plurality of servers 1, a connection destination server to which a plurality of terminals 4 belonging to a same group connect.

Next, details on the management server 2 will be described.

Figure 3:
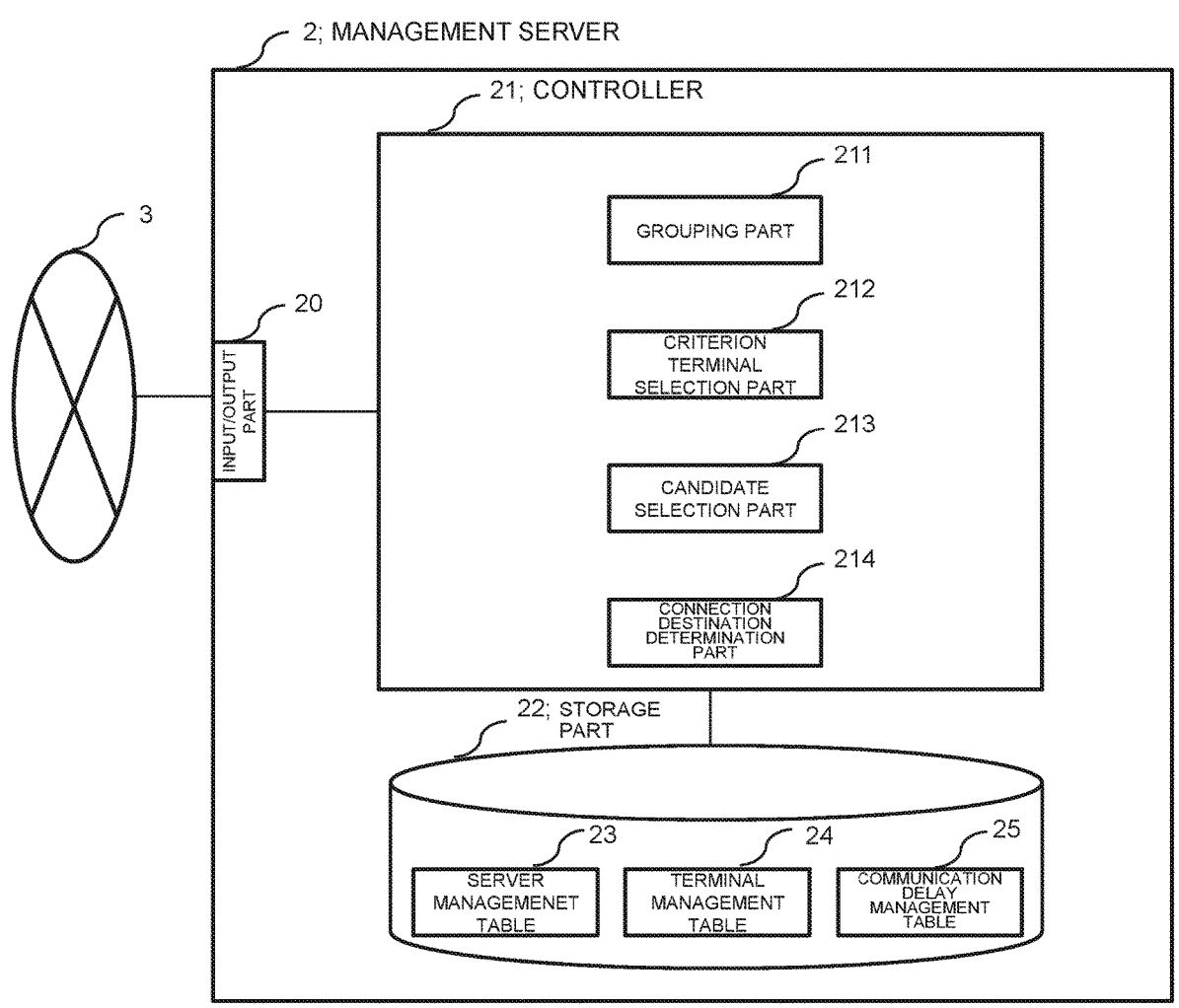
FIG. 3 is a block diagram illustrating an example of an internal configuration of a management server 2.

FIG. 3 is a block diagram illustrating an example of an internal configuration of the management server 2 according to the present example embodiment. The management server 2 according to the present example embodiment comprises an input/output part 20, a controller 21, and a storage 22. Furthermore, it is reasonable that the management server 2 comprises a module(s) that is not shown in FIG. 3.

The input/output part 20 controls a communication between the servers 1 and the terminals 4. The input/output part 20 can be realized by a NIC (Network Interface Card), etc.

The controller 21 realizes a processing(s) to make the management server 2 work. The controller 21 can be realized by using a CPU. Details on the processing(s) performed by the controller 21 will be described later.

The storage part 22 stores necessary information to make the management server 2 work. The storage part 22 can be realized by a magnetic disk apparatus, an optical disk apparatus, and a semiconductor memory.

The storage part 22 stores a server management table 23, a terminal management table 24, and a communication delay management table 25. Note that, the storage part 22 may store the server management table 23, the terminal management table 24, and the communication delay management table 25 in a cash memory. Any method for storing data and any region for storing the data can be used.

The server management table 23 stores information identifying the server 1, an address of the server 1 (ex., IP address), and location information of the server 1, associating each other. In explanations below, the information identifying the server 1 is also referred to as a server ID (identifier).

For instance, a manager of the management server, etc. may input, to the management server 2, the information identifying the server 1, the address of the server 1 (ex., IP address), and the location information of the server 1, etc. Then, the controller 21 may register, to the server management table 23, the information identifying the server 1, the address of the server 1 (ex., IP address), and the location information of the server 1, etc., associating each other.

In other way, the controller 21 may access the servers 1 on periodically predetermined time, then, acquire the location information, etc. from the servers 1. Then the controller 21 may register the location information acquired to the server management table 23. Note that, the controller 21 may acquire, from the servers 1, information identifying the respective servers 1. Alternatively, the controller 21 may determine information identifying the respective servers 1 (server IDs), and register the information identifying the respective servers 1 to the server management table 23.

Figure 4:
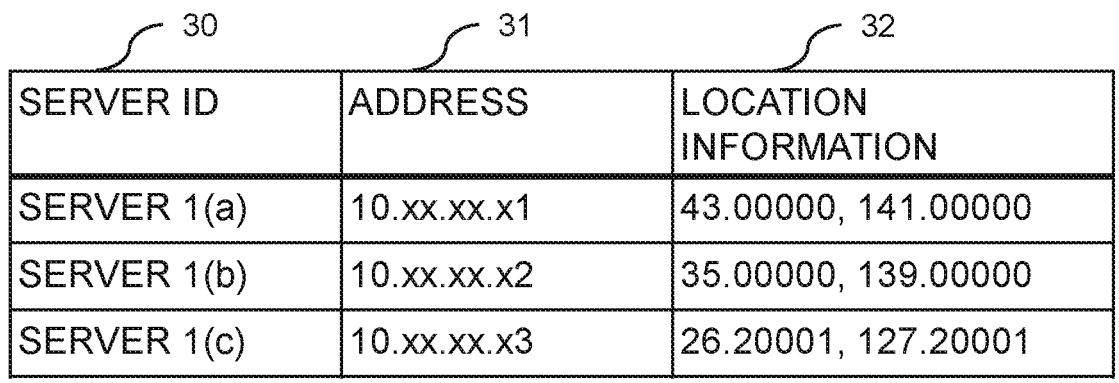
FIG. 4 is an image illustrating an example of a server management table 23.

FIG. 4 provides an image illustrating an example of the server management table 23. The server management table 23 shown in FIG. 4 shows server ID (30), address (31), and location information (32), associating each other. In explanations below, it is assumed that "server 1 (*a*)", "server 1(*b*)", and "server 1 (*c*)" shown in FIG. 4 as the server ID (30) are respectively information identifying the servers 1*a* to 1*c* shown in FIG. 2.

The terminal management table 24 stores information identifying the terminals 4, information identifying a group to which the terminals 4 belong, and location information of the terminals 4, associating each other. In addition, the terminal management table 24 may be configured to further associate addresses (ex., IP addresses) of the respective terminals 4. In explanations below, the information identifying the terminal 4 is also referred to as a user ID. In addition, in explanations below, the information identifying the group is also referred to as a group ID.

For instance, in a case where the management server 2 received, from a terminal 4 where the group ID is not allocated, a request for connecting to a server 1, the controller 21 may allocate a group ID to the terminal 4. Then, the controller 21 registers, to the terminal management table 24, information identifying the terminal 4, a group ID allocated, and location information of the terminal 4, associating each other. Details on a processing of allocating the group ID will be described later.

Figure 5:
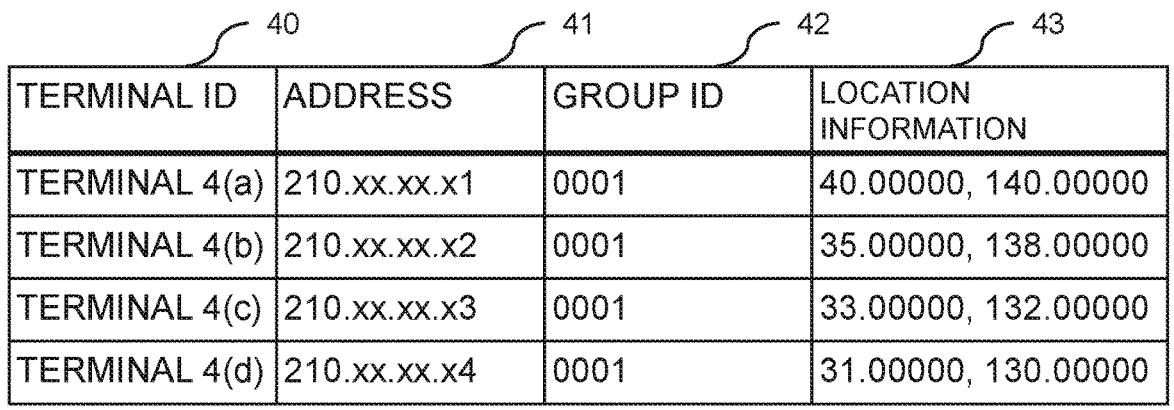
FIG. 5 is an image illustrating an example of a terminal management table 24.

FIG. 5 provides an image illustrating an example of the terminal management table 24. FIG. 5 shows information where terminal ID (40), address (41), group ID (42) and location information (43) are associated. In explanations below, "terminal 4 (*a*)", "terminal 4 (*b*)", "terminal 4(*c*)", "terminal 4(*d*)" shown in FIG. 5 as the terminal ID (40) are respectively information identifying the terminals 4*a* to 4*d* shown in FIG. 2. Accordingly, FIG. 5 shows that the terminals 4*a* to 4*d* belong to a same group (group ID "0001").

The communication delay management table 25 stores information identifying a group, information identifying the destination candidate server(s), and a difference in delays on a communication to the candidate server(s) of the connection destination, associating each other.

Here, the difference in the delays on the communication to the destination candidate server(s) indicates a difference of response times between respective terminals 4, regarding the response times between a destination candidate server(s) and a plurality of terminals 4 belonging to a same group. As communication delays between a plurality of terminals 4 belonging to a same group is small, differences between the plurality of terminals 4 belonging to the same group are small.

For instance, the difference in the delays between the terminals 4 on the communication to the destination candidate server(s) may be an average value of subtraction values of response times between the respective terminals 4, regarding the response times between the destination candidate server(s) and the plurality of terminals 4.

In other way, the difference in the delays between the terminals 4 on the communication to the destination candidate server(s) destination may be a deviation value of subtraction values between the response times of respective terminals 4.

Alternatively, the difference in the delays between the terminals 4 on the communication to the destination candidate server(s) may be a subtraction value between a maximum response time and a minimum response time among response times between the destination candidate server and the terminals 4. Namely, the difference in the delays between the terminals 4 on the communication to the destination candidate server(s) may be a subtraction value between one response time and another response time, wherein the one response time is for one terminal 4 whose response is the earliest; and wherein the another response time for another terminal 4 whose response is the latest. Note that, a calculation method described above is an example of a method of calculating the difference in the delays between the terminals 4 on the communication to the destination candidate server(s). Accordingly, regarding the response times between the destination candidate server(s) and the terminals 4, the difference between the terminals 4 on the response times may be calculated by using other method.

FIG. 6 provides an image illustrating an example of the communication delay management table 25. The communication delay management table 25 shown in FIG. 6 stores a criterion terminal IDs corresponding to the management server 2, information corresponding to a first ranked candidate server of the connection destination, and a second ranked candidate server of the connection destination, associating each other.

The criterion terminal ID corresponding to the management server 2 is information identifying a criterion terminal corresponding to the management server 2. Here, the criterion terminal corresponding to the management server 2 is a terminal 4 selected by the management server 2 from among the terminals 4 belonging to a same group, based on response times between the terminals 4 and the management server 2. Details on the processing of selecting the criterion terminal corresponding to the management server 2 will be described later.

The information corresponding to the first ranked candidate server of the connection destination includes information identifying the first ranked candidate server of the connection destination (a server ID (52)), information identifying the criterion terminal corresponding to the first ranked candidate server of the connection destination (a criterion terminal ID (53)), and a difference in a delay on a communication to the first ranked candidate server of the connection destination (54). Similarly, the information corresponding to the second ranked candidate server of the connection destination includes information identifying the second ranked candidate server of the connection destination (a server ID (55)), information identifying the criterion terminal corresponding to the second ranked candidate server of the connection destination (a criterion terminal ID (56)), and a difference in a delay on a communication to the second ranked candidate server of the connection destination (57).

The management server 2 selects, from among the terminals 4 belonging to a same group, a criterion terminal corresponding to the first ranked candidate server of the connection destination, based on response times between the first ranked candidate server of the connection destination and the terminals 4. Similarly, the management server 2 selects, from among terminals 4 belonging to a same group, a criterion terminal corresponding to the second ranked candidate server of the connection destination, based on response times between the second ranked candidate server of the connection destination and the terminals 4. Details on the processing(s) of selecting the criterion terminals corresponding to the first and second ranked candidate server of the connection destination will be described later.

Next, details on the controller 21 will be described.

The controller 21 comprises a grouping part 211, a criterion terminal selection part 212, a candidate selection part 213, and a connection destination determination part 214.

The grouping part 211 performs grouping a plurality of terminals 4 (not less than two) including arbitrary terminals 4 into a same group. Concretely, the grouping part 211 allocates a same group ID to the plurality of terminals 4 belonging the same group.

For instance, in a case where the management server 2 received, from the terminal 4 to which a group ID is not set, a request for connecting to the server 1, the grouping part 211 may allocate a group ID to the terminals 4 randomly.

In other way, in a case where the management server 2 received the request for the connecting from the terminal 4 to which the group ID is not set, the grouping part 211 may allocate the group ID to the terminals 4 in sequence of receiving the request for the connecting.

Alternatively, the terminals 4 may determine any (arbitrary) group ID. In that case, the terminals 4 may transmit to the management server 2 both the request for the connecting and the group ID determined. In that case, the grouping part 211 may allocate, to the terminals 4 that are sources of the request, the group ID received together with the request for connecting the server 1.

The above method of determining the group ID is an example, and is not intended to limit a method of grouping a plurality of terminals 4 including arbitrary terminals 4. For grouping the plurality of terminals 4 including arbitrary terminals 4, there are various methods for setting any group ID to respective terminals 4, but any method can be used.

In a case where the grouping part 211 allocated the group ID to the terminals 4, the grouping part 211 registers, to the terminal management table 24, information identifying the terminals 4, the group ID, and location information of the terminals 4 at least associating each other.

The criterion terminal selection part 212 selects at least one criterion terminal from among the terminals 4 belonging to the same group. Concretely, the criterion terminal selection part 212 acquires respective response times between the management server 4 and respective terminals 4 belonging to the same group. Then, based on the response times acquired, the criterion terminal selection part 212 selects at least one criterion terminal (in the following, it is also referred to as a first criterion terminal) from among a plurality of terminals 4.

More concretely, the criterion terminal selection part 212 transmits a predetermined packet (for example, executes a ping command) to respective terminals 4 belonging to one group that is a target group, then, measures respective response times from the respective terminals 4. Then, based on the respective response times from the respective terminals 4, the criterion terminal selection part 212 selects at least one criterion terminal.

For instance, the criterion terminal selection part 212 may select, as the criterion terminal (the first criterion terminal), a terminal 4 whose response to the management server 2 is relatively latest among terminals 4 belonging to the group that is the target group. Note that, this is an example, and is not intended to limit the first criterion terminal to the terminal 4 whose response to the management server 2 is relatively latest.

The candidate selection part 213 selects a (one or more) destination candidate server(s) from among a plurality of servers 1 (not less than two). Concretely, based on location information of the criterion terminal and location information of the plurality of servers 1, the candidate selection part 213 selects the destination candidate server(s).

For instance, the candidate selection part 213 may select, as a first ranked candidate server of the connection destination, a server 1 from which a physical distance to the first criterion terminal is closest. Note that, this is an example, and is not intended to the first ranked candidate server of the connection destination to the server 1 from which the physical distance to the first criterion terminal is closest.

Furthermore, the criterion terminal selection part 212 acquires respective response times between the destination candidate server(s) and the terminals 4 belonging to a same group. Then, the criterion terminal selection part 212 selects at least one criterion terminal from among the terminals 4 based on the response times acquired.

More concretely, the criterion terminal selection part 212 notifies addresses of the terminals 4 (for example, IP addresses) to the destination candidate server(s). Then, the criterion terminal selection part 212 transmits, to the destination candidate server(s), a request for measuring response times between the destination candidate server(s) and the terminals 4. The candidate server(s) that received the request for measuring the response times transmits a predetermined packet (for example, executes a ping command) to respective terminals 4, then measures respective response times from the respective terminals 4. Then, the destination candidate server(s) notifies to the management server 2 the respective response times from the respective terminals 4.

In a case where the management server 2 received notifications of the response times from the respective terminals 4, the criterion terminal selection part 212 selects at least one criterion terminal based on the response times.

In addition, based on location information of the criterion terminal selected and location information of the servers 1, the candidate selection part 213 adds a server that satisfies a predetermined condition to a destination candidate server(s).

In the following, the candidate server(s), that is selected by the candidate selection part 213 based on the location information of the second criterion terminal and the location information of the servers 1, is referred to as a second ranked candidate server of the connection destination.

For instance, the candidate selection part 213 may calculate a middle location between the first criterion terminal and the second criterion terminal, and select, as the second ranked candidate server of the connection destination, a server 1 that is at the closest position to the middle location calculated. This an example and is not intended to limit the second ranked candidate server of the connection destination to the server 1 that is at the closest position to the middle location between the first criterion terminal and the second criterion terminal.

In explanations below, the criterion terminal, that is selected by the criterion terminal selection part 212 based on the response times between the first ranked candidate server of the connection destination and the terminals 4, is referred to as the second criterion terminal. Furthermore, in explanations below, the criterion terminal, that is selected by the criterion terminal selection part 212 based on the response times between the second ranked connection destination server and the terminals 4, is referred to as a third criterion terminal.

The connection destination selection part 214 determines a connection destination server, to which a plurality of terminals 4 belonging to a same group connect, from among the destination candidate servers based on the difference in the delays between the plurality of terminals 4 on a communication to the candidate server(s) selected by the candidate selection part 213.

Concretely, in a case where a first communication delay difference is not more than second communication delay difference, the connection destination part 214 determines the first ranked candidate server of the connection destination as the connection destination server, wherein the first communication delay difference is a difference in delays between the plurality of terminals belonging to the same group on the communication to the first ranked candidate server, and wherein the second communication delay difference is a difference in delays between the plurality of terminals belonging to the same group on the communication to the second ranked candidate server.

On the other hand, in a case where the first communication delay difference is more than the second communication delay difference, the connection destination determination part 214 changes the second ranked candidate server of the connection destination to the first ranked candidate server of the connection destination; changes the third criterion terminal to the second criterion terminal; and selects again a second ranked candidate server of the connection destination. In addition, the connection destination determination part 214 changes the second communication delay difference to the first communication delay difference before replacing the first ranked connection destination server. Then, the connection destination determination part 214 calculates a second communication delay difference corresponding to a new second ranked candidate server of the connection destination. Then, again, the connection destination part 214 compares the first communication delay difference with the second communication delay difference, and, based on a result of the comparison, determines whether or not to determine a connection determination server from among the destination candidate servers. The connection destination determination part 214 repeats the above processing(s) until the connection destination server is determined.

Next, operations of the communication system according the present example embodiment will be described. Note that, the processing(s) described below is an example, and is not intended to limit a processing(s) of the communication according to the present example embodiment. It is reasonable that an order of executing of the processing(s) described below may be changed depended on situations.

Figure 7:
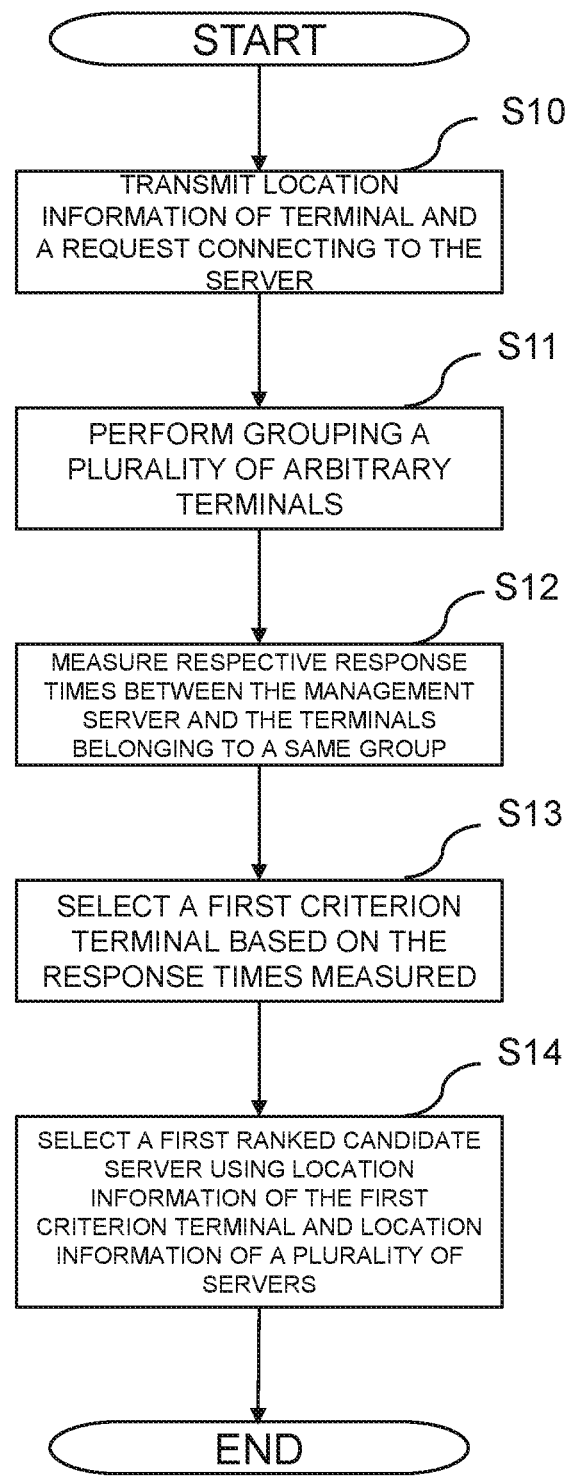
FIG. 7 is a flowchart of an example of operations of the communication system.

FIG. 7 is a flowchart of an example of processings of selecting the first ranked candidate server of the connection destination.

In step S10, the terminal 4 transmits, to the management server 2, location information of the terminal 4 and a request for connecting to the server 1. Note, as described above, it is assumed that the request for the connecting includes information identifying the terminal (a user ID, an IP address of the terminal 4, etc.). In a case where the management server 2 received from the terminal 4, the management server 2 registers, to the terminal management table 24, a user ID of the terminal 4 that is a source of the request for connection, an address of the terminal 4 (IP address, etc.), and location information of the terminal 4.

In step S11. The grouping part 211 performs grouping a plurality of terminals 4 including arbitrary terminals 4.

For instance, it is assumed that grouping four terminals 4 into one group is a predetermined grouping method. In that case, the grouping part 211 may suspend performing to allocate a group ID until completing receiving the request for the connecting from four terminals (4a to 4d). Then, after completing receiving the request for the connecting from the four terminals (4a to 4d), the grouping part 211 may allocate a group ID to the terminals (4a to 4d). Note that, this is an example of a method for grouping a plurality of terminals 4 including arbitrary terminals 4, and is not intended to limit a method of grouping a plurality of terminals 4 including arbitrary terminals 4.

In step S12, the criterion terminal selection part 212 measures respective response times between the management server 2 and the terminals 4 belonging to a same group (the terminals 4 grouped in the step S11). For instance, the criterion terminal selection part 212 transmits a predetermined packet (for example, executes a ping command) to respective terminals 4 belonging to the same group that is a target group, and measures response times from the respective terminals 4.

In step S13, the criterion terminal selection part 212 selects the first criterion terminal based on the response times measured. For instance, the criterion terminal selection part 212 may select, as the first criterion terminal, a terminal 4 whose response to the management server 2 is relatively latest among terminals 4 belonging to the same group that is the target group.

In a case where the criterion terminal selection part 212 selected the first criterion terminal, the criterion terminal selection part 212 registers the information identifying the first criterion terminal, as a criterion terminal ID (51) corresponding to the management server 2, wherein the criterion terminal ID (51) is registered in the communication delay management table 25. In explanations below, it is assumed that the first criterion terminal is the terminal 4d.

In step S14, the candidate selection part 213 selects the first ranked candidate server of the connection destination using location information of the first criterion terminal and location of a plurality of servers 1.

For instance, referring to the management table 23, the candidate selection part 213 may select, as the first ranked candidate server of the connection destination, a server 1 from which a physical distance to the first criterion terminal is closest among servers 1 registered in the server management table 23.

In a case where the candidate selection part 213 selects the first ranked candidate server of the connection destination, the candidate selection part 213 registers, as a first ranked candidate server ID of the connection destination, the information identifying the first ranked candidate server of the connection destination selected, wherein the first ranked candidate server ID of the connection destination is registered in the communication delay management table 25. In explanations below, it is assumed that the first ranked candidate server of the connection destination is a server 1c.

Figure 8:
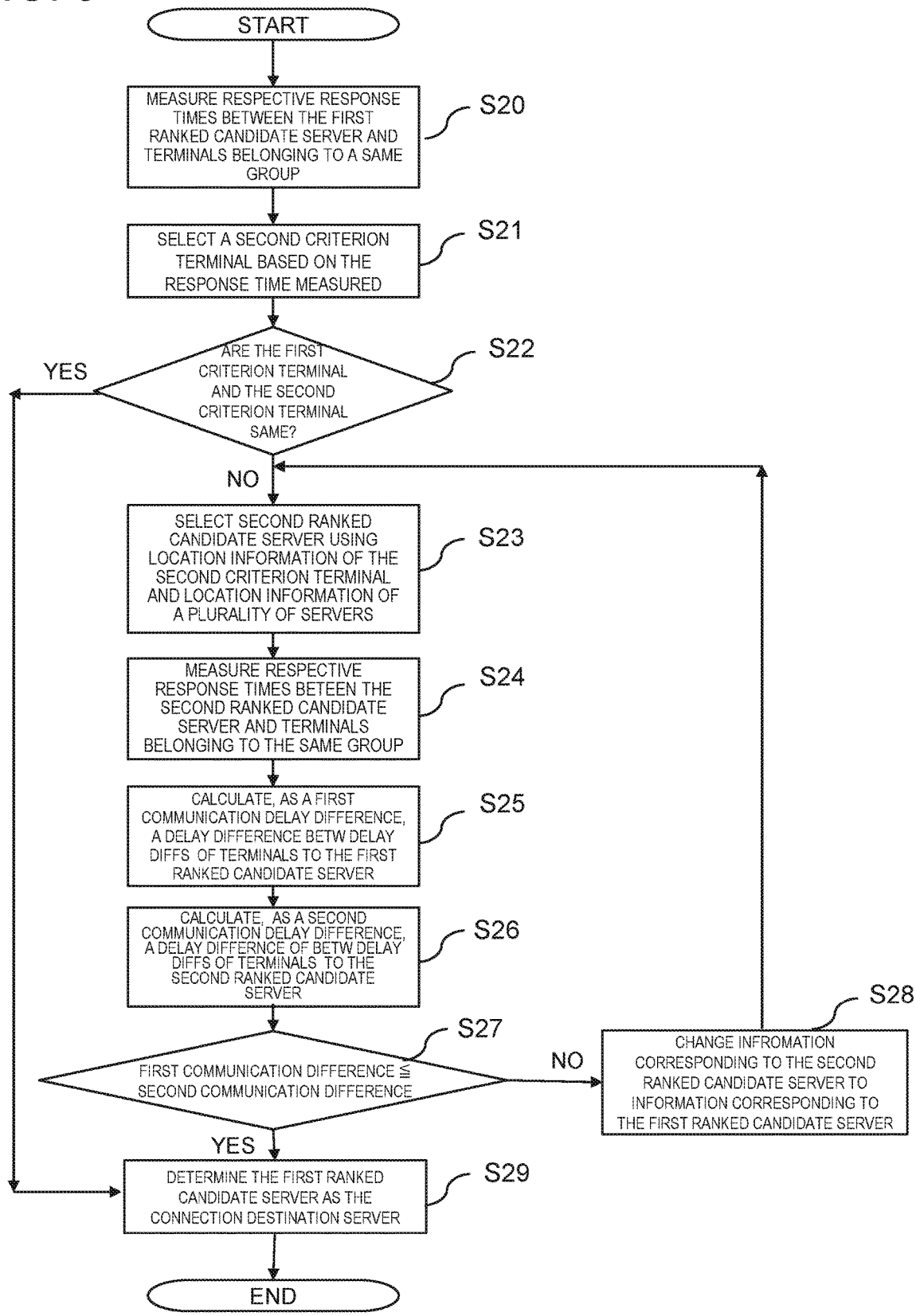
FIG. 8 is a flowchart of an example of operations of the communication system.

Next, with reference to FIG. 8, details on selecting the second ranked candidate server of the connection destination, and determining a connection destination server will be described.

In step S20, the criterion terminal selection part 212 measures respective response times between the first ranked candidate server of the connection destination and the terminals 4 belonging to a same group (the terminal 4 grouped in the step S11 shown in FIG. 7).

Concretely, the management server 2 transmits, to the first ranked candidate server of the connection destination (the server 1c), addresses of the terminals (4a to 4d) belonging to a target group, and transmits a request for measuring response times between the server 1c and respective terminals (4a to 4d). In that case, the server 1c measures response times between the server 1c and the respective terminals (4a to 4d). Then, the server 1c responds the response times measured to the management server 2.

In step S21, the criterion terminal selection part selects the second criterion terminal based on the response times measured. For instance, the criterion terminal selection part 212 may select a terminal 4 whose response to the first ranked candidate server of the connection destination (the server 1c) is relatively latest among terminals 4 belonging to a same group that is a target group. Namely, the criterion terminal selection part 212 may select, as the second criterion terminal, a terminal 4 corresponding to the maximum response time among a plurality of response times received.

In a case where the criterion terminal selection part 212 selects the second criterion terminal, the criterion terminal selection part 212 registers information identifying the second criterion terminal selected as the criterion terminal ID (53) corresponding to the first ranked candidate server of the connection destination, wherein the criterion terminal ID (53) is registered in the communication delay management table 25. In explanations below, it is assumed that the second criterion terminal is a terminal 4a.

In step S22, the connection destination determination part 214 determines whether the first criterion terminal and the second criterion terminal are same or not. In a case where the first criterion terminal and the second criterion terminal are same (Yes in the step S22), the connection destination determination part 214 determines the first ranked candidate server of the connection destination as a connection destination server (step S29). On the other hand, in a case where the first criterion terminal and the second criterion terminal are not same (No in the step S22), the process proceeds to step S23.

In the step S23, the candidate selection part 213 selects the second ranked candidate server of the connection destination using location information of the second criterion terminal and location information of a plurality of the servers 1.

For instance, the candidate selection part 213 may calculate a middle location between the first criterion terminal (the terminal 4d) and the second criterion terminal (the terminal 4c), and select, as the second ranked candidate server of the connection destination, a server 1 that is at the closest position to the middle location calculated.

In a case where the candidate selection part 213 selected the second ranked candidate server of the connection destination, the candidate selection part 213 registers, as the second ranked candidate server ID (55) of the connection destination, information identifying the second ranked candidate server of the connection destination selected, wherein the second ranked candidate server ID of the connection destination is registered in the communication delay management table 25. In explanations below, it is assumed that the second ranked candidate server of the connection destination is a server 1a.

In step S24, the criterion terminal selection part 212 measures respective response times between the second ranked candidate server of the connection destination and the respective terminals 4 belonging to a same group.

Concretely, the management server 2 transmits to the second ranked candidate server of the connection destination (the server 1a) addresses of the terminals 4 (4a to 4d) belonging to a target group, and a request for measuring response times between the server 1a and respective terminals (4a to 4d). In that case, the server 1a responds the response times measured to the management server 2.

Based on the response times between the second ranked candidate server of the connection destination and the terminals 4, the criterion terminal selection part 212 selects a third criterion terminal from among the terminals 4. For instance, the criterion terminal selection part 212 may select, as the third criterion terminal, a terminal 4 whose response time to the second ranked candidate server of the connection destination is relatively latest among terminals 4 belonging to a same group that is a target group. Namely, the criterion terminal selection part 212 may select, as the third criterion terminal, a terminal 4 corresponding to maximum response time among response times received.

In a case where the criterion terminal selection part 212 selects the third criterion terminal, the criterion terminal selection part 212 registers, as a criterion terminal ID (56) corresponding to the second ranked candidate server of the connection destination, information identifying the third criterion terminal selected, wherein the criterion terminal ID (56) is registered in the communication delay management table 25.

In step S25, the connection destination determination part 214 calculates, as a first communication delay difference, a difference in a delay between a plurality of terminals 4 on a communication to the first ranked candidate server of the connection destination. The connection destination determination part 214 registers the first communication delay difference calculated as a communication delay difference (54) corresponding to the first ranked candidate server of the connection destination, wherein the communication delay difference (54) is registered in the communication delay management table 25.

In step S26, the connection destination determination part 124 calculates, as a second communication delay difference, a difference in a delay between a plurality of terminals 4 on a communication to the second ranked candidate server of the connection destination. The connection destination determination part 214 registers the second communication delay difference calculated as a communication delay difference (57) corresponding to the second ranked candidate server of the connection destination, wherein the communication delay difference (57) is registered in the communication delay management table 25.

In step S27, the connection destination determination part 214 determines whether or not the first connection delay difference is not more than the second communication delay difference. In a case where the first communication delay difference is not more than the second communication delay difference (Yes in the step S27), the connection destination determination part 214 determines the first ranked candidate server of the connection destination as a connection destination server.

On the other hand, in a case where the first communication delay difference exceeds the second communication delay difference (No in the step S27), the connection destination determination part 214 changes information corresponding to the second ranked connection destination determination server to the information corresponding to the first ranked candidate server of the connection destination (step S28). Then, the process proceeds to the step S23, and the process is continuing.

Concretely, in the step S28, the connection destination determination part 214 sets the information corresponding to second ranked candidate server of the connection destination as information corresponding to the first ranked candidate server of the connection destination, wherein the information corresponding to second ranked candidate server of the connection destination is registered in the communication delay management table 25. Then, the connection destination determination part 214 deletes the information corresponding to the second ranked candidate server of the connection destination from the communication delay management table 25.

More concretely, the connection destination determination part 214 perform copying a server ID (55), a criterion terminal ID (56), a communication delay difference (57) corresponding to the second ranked candidate server of the connection destination, to a server ID (52), a criterion terminal ID (53), and a communication delay difference (54) corresponding to the first ranked candidate server of the connection destination in the communication delay management table 25 shown in FIG. 6. Then, the connection destination determination part 214 deletes the server ID (55), the criterion terminal ID (56), and the communication delay difference (57) corresponding to the second ranked candidate server of the connection destination from the communication delay management table 25 shown in FIG. 6. Then, the process proceeds to the step S23, and the process is continuing.

As described above, the management server 2 according to the present example embodiment performs grouping a plurality of terminals 4 including arbitrary terminals 4, and determines a connection destination server to which the plurality of terminals 4 including arbitrary terminals 4 belonging to a same group connect. Particularly, the management server 2 determines the connection destination server so that difference in delays between the plurality of terminals 4 belonging to the same group become small. Therefore, the management server 2 according to the present example embodiment contributes to fairly and efficiently connecting to a same server.

Note that, in the above explanations, the processing where the management server 2 calculates the difference in delays between the terminals 4 belonging to a same group on a communication to respective destination candidate servers has been described. However, this is not intended to limit operations of the management server 2. For instance, the respective destination candidate servers may calculate the difference in delays between the terminals 4, and notify the difference in delays calculated to the management server 2.

In addition, in the above explanations, as an example, a processing of grouping terminals into one group has been described. However, this is not intended to limit the number of groups to one group in the communication system according to the present example embodiment. It is reasonable that the management server 2 may perform grouping the terminals 4 into not less than two groups. In addition, it is reasonable that, in a case where the management server 2 performs grouping the terminals 4 into not less than two groups, the management server 2 determines, for respective groups, a connection destination server to which the terminals 4 belonging to respective groups connect.

A part of/a whole of the above example embodiments can be described as the following modes, but not limited the following modes.

(Mode 1) As the management server according to the first aspect.

(Mode 2) The management server according to Mode 1, a criterion terminal selection part that selects at least one criterion terminal from the plurality of terminals belonging to the same group, wherein based on location information of the criterion terminal and location information of the plurality of servers, the candidate selection part selects the destination candidate server(s); and the connection destination selection part determines the connection destination server from among the destination candidate servers based on the difference in the delays between the plurality of terminals on the communication to the destination candidate server(s).

(Mode 3) The management server according to Mode 2, wherein the criterion terminal selection part acquires respective response times between the own management server and the plurality of terminals belonging to the same group, and, selects the criterion terminal from the plurality of terminals based on the response times acquired.

(Mode 4) The management server according to Mode 2, wherein the criterion terminal selection part acquires respective response times between the destination candidate server(s) and the plurality of terminals belonging to the same group, and selects the criterion terminal from the plurality of terminals based on the response times acquired; and, based on location information of the criterion terminal selected and location information of the plurality of servers, the candidate selection part adds a server that satisfies a predetermined condition to the destination candidate server(s).

(Mode 5) The management server according to Mode 2, wherein, based on response times between the own management server and the plurality of terminals belonging to the same group, the criterion terminal selection part selects a first criterion terminal from the plurality of terminals; based on location information of the first criterion terminal and location of the plurality of terminals, the candidate selection part selects a first ranked candidate server of the connection destination; based on response times between the first ranked candidate server of the connection destination and the plurality of terminals, the criterion terminal selection part selects a second criterion terminal from the plurality of terminals; and based on location information of the second criterion terminal and location information of the plurality of terminals, the candidate selection part selects a second ranked candidate server of the connection destination.

(Mode 6) The management server according to Mode 5, wherein based on response times between the second ranked candidate server of the connection destination and the plurality of terminals, the criterion terminal selection part selects a third criterion terminal from among the plurality of terminals; in a case where a first communication delay difference is not more than a second communication delay difference, the connection destination determination part determines the first ranked candidate server of the connection destination as the connection destination server, wherein the first communication delay difference is a difference in delays between the plurality of terminals belonging to the same group on the communication to the first ranked candidate server, and wherein the second communication delay difference is a difference in delays between the plurality of terminals belonging to the same group on the communication to the second ranked candidate server; and in a case where the first communication delay difference is more than the second communication delay difference, the connection destination determination part changes the second ranked candidate server of the connection destination to the first ranked candidate server of the connection destination, and changes the third criterion terminal to the second criterion terminals; and selects again a second ranked candidate server of the connection destination.

(Mode 7) The management server according to Mode 2, further comprising: a storage part that stores a table including information identifying a group, information identifying the destination candidate server(s), information identifying the criterion terminal corresponding to the destination candidate server(s), and a difference in delays between the plurality of terminals belonging to the same group on a communication to the destination candidate server(s), associating each other.

(Mode 8) The management server according to Mode 1, wherein, in a case where the first criterion terminal and the second criterion terminal are same, the connection destination determination part determines the first ranked candidate server of the connection destination as the connection destination server.

(Mode 9) The management server according to Mode 7, the storage part stores a table including information identifying the terminals, information identifying a group to which the terminals belong, and location information of the terminals, associating each other.

(Mode 10) As the communication system according to the second aspect.

(Mode 11) As the management server control method according to the third aspect.

(Mode 12) As the non-transitory computer readable recording medium according to the fourth aspect.

Note that, Modes 10 to 12 can be developed into Modes 2 to 9 as Mode 1.

It is to be noted that the various disclosures of the abovementioned Patent Literatures are incorporated herein by reference thereto. Modifications and adjustments of example embodiments are possible within the bounds of the entire disclosure (including the scope of the claims) of the present invention, and also based on fundamental technological concepts thereof. Furthermore, various combinations and selections of various disclosed elements (including respective elements of the respective claims, respective elements of the respective example embodiments, respective elements of the respective drawings, and the like) are possible within the scope of the entire disclosure of the present invention. That is, the present invention clearly includes every type of transformation and modification that a person skilled in the art can realize according to the entire disclosure including the scope of the claims and to technological concepts thereof. In particular, with regard to numerical ranges described in the present specification, arbitrary numerical values and small ranges included in the relevant ranges should be interpreted to be specifically described even where there is no particular (explicit) description thereof.

1, 1a to 1c server
2, 1000 management server
3 network
4, 4a to 4d terminal
20 input/output part
21 controller
22 storage part
23 server management table
24 terminal management table
25 communication delay management tables
30, 52, 55 server ID
31, 41 address
32, 43 location information
40 terminal ID
42, 50 group ID
31, 53, 56 criterion terminal ID
54, 57 communication delay difference
211, 1001 grouping part
212 criterion terminal selection part
213, 1002 candidate selection part
214, 1003 connection destination determination part

What is claimed is:

1. A management server, comprising:
a processor; and
a non-transitory computer-readable data storage medium storing program code executable by the processor to:
perform grouping a plurality of terminals including arbitrary terminals into a same group;
select at least one criterion terminal from among the plurality of terminals belonging to the same group based on response times between the terminals and the management server;
select one or more destination candidate server(s) from among a plurality of predetermined servers based on location information indicating geographical position of the criterion terminal and location information indicating geographical positions of the plurality of servers; and
determine, from among the destination candidate servers, a connection destination server to which the plurality of terminals belonging to the same group connect in a manner where the difference in the delays between the plurality of terminals belonging to the same group on the communication to the connection destination server is less than a threshold, based on a difference in delays between the plurality of terminals belonging to the same group on a communication to the destination candidate servers.

2. The management server according to claim 1, wherein the processor acquires respective response times between the management server and the plurality of terminals belonging to the same group, and, selects the criterion terminal from among the plurality of terminals based on the response times acquired.

3. The management server according to claim 1, wherein the server's processor acquires respective response times between the destination candidate servers and the plurality of terminals belonging to the same group, and selects the criterion terminal from among the plurality of terminals based on the response times acquired; and
based on location information of the criterion terminal selected and location information of the plurality of servers, the server's processor adds a server that satisfies a predetermined condition to the destination candidate servers.

4. The management server according to claim 1, wherein based on response times between the management server and the plurality of terminals belonging to the same group, the processor selects a first criterion terminal from among the plurality of terminals;

based on location information of the first criterion terminal and location of the plurality of terminals, the processor selects a first ranked candidate server of a connection destination;

based on response times between the first ranked candidate server of the connection destination and the plurality of terminals, the processor selects a second criterion terminal from among the plurality of terminals; and based on location information of the second criterion terminal and location information of the plurality of terminals, the processor selects a second ranked candidate server of the connection destination.

5. The management server according to claim 4, wherein based on response times between the second ranked candidate server of the connection destination and the plurality of terminals, the processor selects a third criterion terminal from among the plurality of terminals;

in a case where a first communication delay difference is not more than a second communication delay difference, the processor determines the first ranked candidate server of the connection destination as the connection destination server, wherein the first communication delay difference is a difference in delays between the plurality of terminals belonging to the same group on the communication to the first ranked candidate server, and wherein the second communication delay difference is a difference in delays between the plurality of terminals belonging to the same group on the communication to the second ranked candidate server; and in a case where the first communication delay difference exceeds the second communication delay difference, the processor changes the second ranked candidate server of the connection destination to the first ranked candidate server of the connection destination, and changes the third criterion terminal to the second criterion terminal; and selects again a second ranked candidate server of the connection destination.

6. The management server according to claim 1, wherein the program code is executable by the processor to further:

store a table including information identifying a group, information identifying the destination candidate servers, information identifying the criterion terminal corresponding to the destination candidate servers, and a difference in delays between the plurality of terminals belonging to the same group on a communication to the destination candidate servers.

7. A communication system, comprising:

a management server that connects to a plurality of terminals via a network; and a plurality of predetermined servers located at distributed different places, wherein the management server comprises a processor and a non-transitory computer-readable data storage medium storing program code executable by the processor to:

perform grouping a plurality of terminals including arbitrary terminals into a same group;

select at least one criterion terminal from among the plurality of terminals belonging to the same group based on response times between the terminals and the management server;

select one or more destination candidate servers from among the plurality of predetermined servers based on location information indicating geographical position of the criterion terminal and location information indicating geographical positions of the plurality of servers; and determine, from among the destination candidate servers, a connection destination server to which the plurality of terminals belonging to the same group connect in a manner where the difference in the delays between the plurality of terminals belonging to the same group on the communication to the connection destination server is less than a threshold, based on a difference in delays between the plurality of terminals belonging to the same group on a communication to the destination candidate servers.

8. A management server control method, to perform:

performing grouping a plurality of terminals including arbitrary terminals into a same group;

selecting at least one criterion terminal from among the plurality of terminals belonging to the same group based on response times between the terminals and a management server;

selecting one or more destination candidate server from among a plurality of predetermined servers based on location information indicating geographical position of the criterion terminal and location information indicating geographical positions of the plurality of servers; and determining, from the destination candidate servers, a connection destination server to which the plurality of terminals belonging to the same group connect in a manner where the difference in the delays between the plurality of terminals belonging to the same group on the communication to the connection destination server is less than a threshold, based on a difference in delays between the plurality of terminals belonging to the same group on a communication to the destination candidate servers.

9. A non-transitory computer-readable recording medium storing a program causing a computer that controls a management server to execute processing comprising:

performing grouping a plurality of terminals including arbitrary terminals into a same group;

selecting at least one criterion terminal from among the plurality of terminals belonging to the same group based on response times between the terminals and the management server;

selecting one or more destination candidate servers from among a plurality of predetermined servers based on location information indicating geographical position of the criterion terminal and location information indicating geographical positions of the plurality of servers; and determining, from among the destination candidate servers, a connection destination server to which the plurality of terminals belonging to the same group connect in a manner where the difference in the delays between the plurality of terminals belonging to the same group on the communication to the connection destination server is less than a threshold, based on a difference in delays between the plurality of terminals belonging to the same group on a communication to the destination candidate servers.

* * * * *